Figure 1:
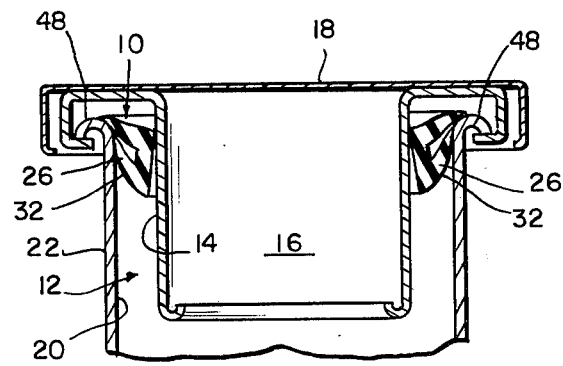

United States Patent [19]

Sloan, Jr.

[11] 4,072,245

[45] Feb. 7, 1978

[54] FILLER NECK CAP WITH O-RING SEAL

[75] Inventor: Paul H. Sloan, Jr., Sturgis, Mich.

[73] Assignee: Stant Manufacturing Company, Inc., Connersville, Ind.

[21] Appl. No.: 706,051

[22] Filed: July 16, 1976

[51] Int. Cl.$^2$ .............................................. B65D 41/02
[52] U.S. Cl. ........................... 220/295; 220/DIG. 33; 277/206 R; 277/208; 16/2; 285/110; 285/232; 285/345
[58] Field of Search ....... 220/DIG. 32, 295, DIG. 33, 220/304, 301, 302; 277/206 R, 207 A, 208, 231, 209; 16/2, 3; 285/110, 111, 231, 232, 345

[56] References Cited

U.S. PATENT DOCUMENTS

| 1,697,814 | 1/1929 | Forbes | 16/2 X |
|---|---|---|---|
| 2,271,777 | 2/1942 | Nathan | 285/110 X |
| 2,560,092 | 7/1951 | De La Mater | 16/2 X |
| 2,733,052 | 1/1956 | Luther | 220/301 X |
| 2,882,073 | 4/1959 | James | 277/207 A X |
| 3,015,510 | 1/1962 | Bates | 277/206 |
| 3,127,049 | 3/1964 | Welty et al. | 220/301 |
| 3,498,623 | 3/1970 | Rowe | 277/206 |
| 3,572,539 | 3/1971 | Wunderlich | 220/301 |
| 3,746,209 | 7/1973 | Urban et al. | 220/295 |
| 3,918,605 | 11/1975 | Butler | 220/298 X |

FOREIGN PATENT DOCUMENTS

| 2,262,968 | 7/1973 | Germany | 277/206 R |
|---|---|---|---|
| 6,710,603 | 2/1969 | Netherlands | 285/231 |
| 926,789 | 5/1963 | United Kingdom | 277/206 R |

Primary Examiner—Robert S. Ward, Jr.
Attorney, Agent, or Firm—Jenkins, Coffey & Hyland

[57] ABSTRACT

A resilient O-ring seal for an annular space between a first radially inner surface and a second radially outer surface. The radial width of the annular space is less than the radial dimension of the O-ring. The O-ring includes an annular, radially outwardly facing groove defined by an axially inner lip, an axially outer lip, and a connecting web portion. The inner and outer lips both include axially inner and outer surfaces. The web portion includes a radially inwardly facing surface and a radially outwardly facing surface. As the O-ring is projected axially into the annular space, the axially inner surface of the inner lip contacts the second surface and is urged axially outwardly in a wiping action. The axially outward wiping movement of the inner lip causes a twisting or rolling of the ring such that the web radially inner surface is urged radially outwardly at its axially inner extent and is urged radially inwardly at its axially outer extent against the first surface. Such resilient deformation of the inner lip and web radially compressively seals the annular space. Further, the axially inner surface of the outer lip contacts the second surface as the O-ring is projected axially further into the annular space. The axially outer lip of the annular ring thereby provides direct compressive axial sealing of the annular space.

3 Claims, 2 Drawing Figures

FILLER NECK CAP WITH O-RING SEAL

This invention relates to sealing rings for sealing annular spaces between surfaces. The type of sealing ring to which this invention relates is commonly referred to as an "O-ring". More specifically, this invention relates to an improved type of O-ring having a C-shaped radial cross section in a plane extending through the axis of the ring.

O-rings having non-circular radial cross sections in planes extending through their axes are known in the art. O-rings of this type are described in, for example, the following United States patents:

| Patent Number | Issue Date | Inventor |
| --- | --- | --- |
| 2,547,185 | April 3, 1951 | Von Bolhar |
| 2,729,478 | January 3, 1956 | Chambers, Jr. et al |
| 2,746,778 | May 22, 1956 | Hurlburt et al. |
| 2,906,552 | September 29, 1959 | White |
| 3,085,515 | April 16, 1963 | Workman |
| 3,052,476 | September 4, 1962 | Workman |
| 3,347,556 | October 17, 1967 | Fleckenstein et al |
| 3,366,392 | January 30, 1968 | Kennel |
| 3,418,001 | December 24, 1968 | Rentschler et al |
| 3,490,232 | January 20, 1970 | Baldwin |
| 3,591,207 | July 6, 1971 | Fisher |
| 3,854,761 | December 17, 1974 | David |

When such O-rings are made of resilient materials, the O-rings collapse to fill, or partly to fill, annular spaces between parts so that the parts are sealed to one another.

It is a primary object of the present invention to provide an improved resilient ring for sealing an annular space between two parts.

According to the present invention, the resilient annular ring seals an annular space between a first radially inner surface and a second radially outer surface. The radial width of the annular space is less than the radial dimension of the ring. The ring includes an annular, radially outwardly facing groove defined by an axially inner lip, an axially outer lip, and a connecting radially inner web portion. The inner and outer lips both include axially inner and outer surfaces. The web portion includes a radially inwardly facing surface and a radially outwardly facing surface. The groove is defined between the axially outer surface of the inner lip, the axially inner surface of the outer lip, and the radially outwardly facing surface of the web. As the first, radially inner surface is projected axially into the annular space, the axially inner surface of the inner lip contacts the second surface and is urged axially outwardly. Axially outward movement of the inner lip causes a twisting or rolling of the web such that the web radially inner surface is urged resiliently radially outwardly at its axially inner extent and is urged radially inwardly at its axially outer extent against the first surface. Such resilient deformation of the inner lip and web radially compressively seals the annular space. Further according to the present invention, the axially inner surface of the outer lip contacts the second surface as the first surface is projected axially further into the annular space. The axially outer lip of the annular ring thereby provides direct compressive axial sealing of the annular space. Further, the contact between the axially inner surface of the outer lip and the second surface causes additional force to be exerted on the axially outer extent of the web, urging it against the first surface.

Figure 2:
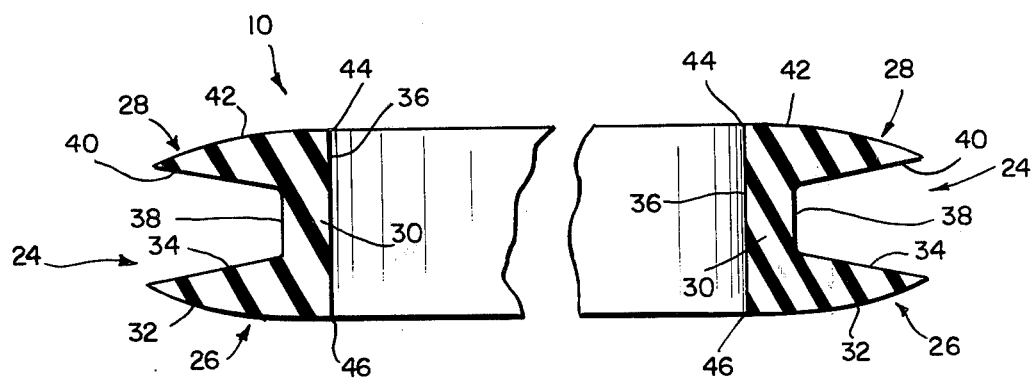

Additional objects of the present invention will become apparent to those skilled in the art to which the invention pertains by referring to the following description of a preferred embodiment and the accompanying drawings which illustrate the invention. In the drawings:

FIG. 1 is a cross section of a vehicle fuel cap equipped with the sealing ring of the instant invention, engaging a vehicle fuel filler neck; and FIG. 2 is a fragmentary radial cross section of the sealing ring of FIG. 1, taken through the plane of the axis of the sealing ring.

Referring to FIG. 1, the annular sealing ring 10 seals an annular space 12 between a first radially inner surface 14, e.g., the radially outer surface of a pressure-vacuum vent valve housing 16 of a fuel filler neck cap 18, and a second, radially outer surface 20, e.g., the radially inner surface of a fuel filler neck 22.

Referring to FIG. 2, ring 10 has an annular, radially outwardly opening groove 24. Ring 10 further includes an axially inner lip 26, an axially outer lip 28 and a connecting radially inner web portion 30. Inner lip 26 defines an axially inner surface 32 and an axially outer surface 34. Web 30 includes a radially inwardly facing surface 36 and a radially outwardly facing surface 38. Outer lip 28 includes an axially inner surface 40 and an axially outer surface 42.

Annular, radially outwardly opening groove 24 is defined by surfaces 34, 38, and 40. The web radially inner surface 36 includes an axially outer extent, or edge, 44 and an axially inner extent, or edge, 46.

Referring again to FIG. 1, ring 10 is disposed about the radially outer surface 14 of valve housing 16 of fuel cap 18. As cap 18 is projected axially inwardly into fuel filler neck 22, axially inner surface 32 contacts the lip 48 at the axially outer end of filler neck 22. Contact with lip 48 urges the sealing ring inner lip 26 axially outwardly. The resulting twisting or rolling of ring 10 causes the axially inner edge 46 of inner surface 36 to be urged radially outwardly. At the same time, the axially outer edge 44 of surface 36 is urged against surface 14 of valve housing 16. Resilient bending at edge 46 allows the sealing forces exerted by the axially inner surface 32 of inner lip 26 on the filler neck lip 48 and the force exerted by edge 44 on surface 14 to reach equilibrium. At equilibrium, when the cap 18 is projected axially into filler neck 22, a radial seal is established in annular space 12. The strength of this radial seal increases as lower lip 26 is resiliently deformed further by axial projection of cap 18 further into neck 22. When lip 26 enters the constant diameter portion of surface 20 (axially inwardly from lip 48) the radial sealing force approaches a maximum.

Axially inner surface 40 of outer lip 28 also contacts lip 48 of filler neck 22 when cap 18 is projected axially into filler neck 22. Such contact causes additional force to be exerted by the axially outer edge 44 of surface 36 against surface 14. Here too, equilibrium is reached between the forces exerted upon surface 20 of the neck 22 by surface 40 and the force exerted upon surface 14 of valve housing 16 by edge 44. This equilibrium provides a direct, compressive, static, axial seal between surfaces 14, 20.

The annular ring 10 is capable of withstanding axial and radial movement under static or dynamic loading to prevent the seal created thereby in the annular space 12 from breaking. Relative movement of surfaces 14 and 20 maintains or increases the radial compressive or sealing forces exerted between such surfaces by lip 26 and web portion 30. Contact between lip 26 and the filler neck lip 48 causes surface 32 of axially inner lip 26 to roll axially outwardly, increasing the bending force along edge 46. The effect of this increased bending force is to cause greater radial sealing force between surface 32 and surface 14, and between edge 44 and surface 14. The axial seal is a direct compressive seal. It is established and maintained by contact between surface 40 of lip 28 and lip 48 of the filler neck on one side, and by contact between edge 44 and surface 14 on the other.

Ring 10 can be constructed of any suitable resilient material which is sufficiently chemically resistant to avoid reaction with the environments which it seals. Illustratively, a ring 10 for sealing an automobile fuel filler neck cap to enclose the gasoline vapor environment within the fuel filler neck can be constructed of urethane rubber. One such sealing ring 10 was made with an outside diameter of 2 inches and an inside diameter of 1.58 inches. The thickness of web 30 was 0.06 inch. The axial thickness of the ring 10 (axial length of wall 36) was 0.250 inch. The axial thickness of each of lips 26, 28 where it joins web 30 was approximately 0.08 inch.

There is thus illustrated an O-ring 10 for sealing an annular space 12, ring 10 comprising a web 30 including a normally cylindrical, radially inwardly facing surface 36 and a radially outwardly facing surface 38. Ring 10 includes an inner lip 26 and an outer lip 28. Lips 26, 28 extend radially outwardly from web 30 at its axially inner and outer ends, respectively. Lip 26 includes axially inner surface 32 and axially outer surface 34. Lip 28 includes axially inner surface 40 and axially outer surface 42. Each of lips 26, 28 is axially thick at its radially inner extent adjacent web 30 and tapers to an axially narrow thickness at its radially outer extent. Surfaces 34, 38, 40 define a radially outwardly opening, annular groove 24 about the periphery of ring 10. Illustratively, the axially thick portions of lips 26, 28 adjacent web 30 each have an axial thickness approximately equal to one-third of the total axial thickness of ring 10.

What is claimed is:

1. For use with a filler neck having an axially outer end and a filler neck cap having a shank portion extending axially into the filler neck when the cap is in its use position, the shank providing a first radially inner surface and the filler neck providing a second radially outer surface, the first and second surfaces defining therebetween an annular space, a resilient annular ring for sealing the annular space, the ring being mounted on the shank, the annular space having a radial width less than the radial dimension of the ring, the ring including an axially inner lip, an axially outer lip, and a connecting radially inner web portion, the lips and web defining an annular, radially outwardly facing groove in the ring, the inner lip including axially inner and outer surfaces, the web portion including a radially inwardly facing surface adjacent the first surface and a radially outwardly facing surface, and the outer lip including axially inner and outer surfaces, the improvement wherein the inner lip inner surface is formed for resilient axially outward wiping movement by the second surface upon axially inward movement of the shank with the ring mounted thereon into the filler neck, the web radially inner surface being resiliently deflected radially outwardly at its axially inner extent and being urged radially inwardly against the radially inner surface at its axially outer extent.

2. The invention of claim 1 wherein the axially inner surface of the outer lip contacts the axially outer end of the filler neck and the second surface as the shank and ring are projected axially into the filler neck, resilient deformation of the outer lip urging the axially outer extend of the web radially inner surface radially inwardly against the first surface.

3. In combination, a filler neck, a filler neck cap having a use position for closing the filler neck, the filler neck cap providing a first male tube section and the filler neck providing a second female tube section, the first section being inserted into the second to define therebetween an annular space when the cap is in the use position, a resilient ring for sealing the annular space, the ring comprising a web including a normally cylindrical, radially inwardly facing surface and a radially outwardly facing surface, axially outer and inner lips extending radially outwardly from the web at axially outer and inner ends, respectively, thereof, each of the outer and inner lips having an axially outer surface and an axially inner surface, each of the outer and inner lips being axially thick at its radially inner extent adjacent the web and tapering to an axially narrow thickness at its radially outer extent, the axially inner surface of the outer lip, the axially outer surface of the inner lip and the radially outer surface of the web defining a radially outwardly opening, annular groove about the periphery of the ring, the inner lip inner surface being formed for resilient axially outward wiping deflection against the second female tube section as the first male tube section is inserted axially therein, such axially outward deflection causing the web to be resiliently radially outwardly deflected at its axially inner extent.

* * * * *

UNITED STATES PATENT OFFICE
CERTIFICATE OF CORRECTION

Patent No. 4,072,245                   Dated February 7, 1978

Inventor(s) Paul H. Sloan, Jr.

It is certified that error appears in the above-identified patent and that said Letters Patent are hereby corrected as shown below:

Column 4, line 22, (Claim 2), change "extend" to --extent--.

Signed and Sealed this

Thirtieth Day of May 1978

[SEAL]

Attest:

RUTH C. MASON
Attesting Officer

LUTRELLE F. PARKER
Acting Commissioner of Patents and Trademarks